United States Patent
Dai et al.

(10) Patent No.: US 8,758,200 B2
(45) Date of Patent: Jun. 24, 2014

(54) HYBRID TORQUE CONVERTER CONTROL DURING ROLLING ENGINE START FOR DRIVELINE DAMPING

(75) Inventors: Zhengyu Dai, Canton, MI (US); Hong Jiang, Birmingham, MA (US)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 13/465,914

(22) Filed: May 7, 2012

(65) Prior Publication Data

US 2013/0296116 A1 Nov. 7, 2013

(51) Int. Cl.
*B60W 10/02* (2006.01)
*B60W 10/04* (2006.01)

(52) U.S. Cl.
USPC .............................................. 477/176; 477/8

(58) Field of Classification Search
USPC ............. 477/5, 7, 8, 166, 167, 174–176, 180, 477/181
See application file for complete search history.

(56) References Cited

U.S. PATENT DOCUMENTS

| | | | |
|---|---|---|---|
| 6,808,470 B2 * | 10/2004 | Boll | 477/6 |
| 7,192,386 B2 * | 3/2007 | Dietzel | 477/180 |
| 7,351,182 B2 | 4/2008 | Kobayashi | |
| 7,896,114 B2 | 3/2011 | Colvin et al. | |
| 8,437,933 B2 * | 5/2013 | Akebono et al. | 701/68 |
| 2009/0124452 A1 * | 5/2009 | Fuechtner et al. | 477/5 |
| 2009/0124453 A1 * | 5/2009 | Seel et al. | 477/5 |
| 2012/0202646 A1 * | 8/2012 | Suzuki et al. | 477/5 |
| 2013/0274969 A1 * | 10/2013 | Wang et al. | 701/22 |
| 2013/0296103 A1 * | 11/2013 | Dai et al. | 477/5 |
| 2013/0296104 A1 * | 11/2013 | Nefcy | 477/5 |

FOREIGN PATENT DOCUMENTS

WO 2009109831 A1 9/2009

* cited by examiner

*Primary Examiner* — Justin Holmes
(74) *Attorney, Agent, or Firm* — David B. Kelley; Brooks Kushman P.C.

(57) ABSTRACT

A system and method for controlling a hybrid vehicle including a transmission having a torque converter with a bypass clutch include controlling the slip between the impeller and the turbine of the torque converter in slip mode operation to regulate the converter torque ratio and maintain substantially constant torque at the turbine. Controlled slip uses the hydrodynamic coupling of the torque converter to balance the desired and delivered torque while damping torque disturbances transmitted through the driveline to manage noise, vibration and harshness (NVH).

20 Claims, 2 Drawing Sheets

HYBRID TORQUE CONVERTER CONTROL DURING ROLLING ENGINE START FOR DRIVELINE DAMPING

TECHNICAL FIELD

The present invention relates to control systems and methods for vehicles utilizing a hybrid powertrain, such as a modular hybrid transmission configuration with a traction motor between an engine and a transmission having a torque converter.

BACKGROUND

Conventional automatic vehicles may include a transmission having a torque converter to provide a hydrodynamic coupling with torque multiplication. The hydrodynamic coupling allows the engine to continue running while connected to the transmission when the vehicle is stationary. In addition, the torque converter provides torque multiplication to assist vehicle launch and provides damping of driveline torque disturbances. The torque multiplication or torque ratio varies with the speed difference or slip between the torque converter input element (impeller) and output element (turbine). A torque converter clutch or bypass clutch may be provided to mechanically or frictionally couple the impeller and the turbine to eliminate the slip and associated losses to improve efficiency. However, driveline torque disturbances are then more easily transmitted to the vehicle cabin and may result in noise, vibration, and harshness (NVH) and reduce vehicle driveability. As such, the torque converter bypass clutch is usually disengaged or released when the vehicle operating conditions are likely to produce driveline torque disturbances.

Various hybrid vehicle configurations have been developed that utilize both an engine and a motor to drive a vehicle through a transmission, which may be implemented by various types of transmissions that may or may not include a torque converter depending on the particular application. For example, a continuously variable transmission (CVT) or automated manual transmission (AMT) may not include a torque converter whereas a step-ratio automatic transmission having a torque converter may be used to provide similar advantages as in a conventional powertrain as previously described.

Hybrid vehicles generally include an electrical drive mode where the motor is used to power the vehicle and the engine is off. Applications having a torque converter bypass clutch may engage or lock the bypass clutch in the electrical drive mode to improve efficiency. Another hybrid vehicle operation mode uses both the engine and the motor to power the vehicle. A rolling engine start may be used when the vehicle is moving to transition from the electrical drive mode to the hybrid drive mode. The bypass clutch is typically disengaged during engine start to mitigate associated driveline torque disturbances. However, this reduces efficiency as previously described. As a rolling engine start event happens, the traditional control approach does not address the complexity of the power transition and its impact on the driveability.

SUMMARY

Embodiments according to the present disclosure include systems and methods for controlling a hybrid vehicle having a traction motor disposed between an engine and a transmission having a torque converter including an impeller and a turbine. In one embodiment, a method for controlling a hybrid vehicle includes controlling slip speed between the impeller and the turbine of the torque converter to maintain turbine torque substantially constant during starting of the engine.

In one embodiment, a method for controlling a hybrid vehicle having an engine selectively coupled by a disconnect clutch to a traction motor coupled to an automatic transmission having a torque converter with an impeller, a turbine, and a torque converter clutch, includes operating the vehicle to provide a driver demanded torque in an electric drive mode using only the traction motor with the disconnect clutch disengaged and the torque converter clutch locked with zero slip speed between the impeller and the turbine; engaging the disconnect clutch to start the engine using traction motor torque; controlling torque converter clutch apply pressure to control the slip speed and provide an associated converter torque ratio that maintains a substantially constant turbine torque to compensate for the traction motor torque used while starting the engine; controlling torque converter clutch apply pressure to control the slip speed and provide an associated converter torque ratio based on a combined engine torque and traction motor torque to provide the driver demanded torque after starting the engine; and controlling torque converter clutch apply pressure to lock the torque converter clutch and reduce the slip speed to zero after starting the engine.

Embodiments may also include a hybrid electric vehicle having an engine, an automatic transmission including a torque converter with an impeller, a turbine, and a bypass clutch, a traction motor coupled to the impeller and selectively coupled to the engine by a disconnect clutch, and a controller configured to control the bypass clutch to vary a speed difference between the impeller and the turbine to maintain turbine torque substantially constant while starting the engine using traction motor torque. In one embodiment, the controller is configured to control the bypass clutch to provide a desired converter torque ratio based on the speed difference, with the desired converter torque ratio being based on a driver demanded torque, current transmission gear ratio, transmission losses, and traction motor torque used to start the engine. In one embodiment, the controller is configured to modulate apply pressure of the bypass clutch to control the speed difference between the impeller and the turbine. The controller may also be configured to lock the bypass clutch to reduce the speed difference to zero after starting the engine. In various embodiments, the controller is configured to increase the speed difference while starting the engine by reducing the apply pressure of the bypass clutch.

The present invention resolves various challenges associated with prior engine start strategies by providing a modular hybrid transmission (MHT) configuration and a control system in a production hybrid vehicle. The modular hybrid transmission configuration includes an automatic transmission having a torque converter that couples input from one or both driving sources, in the form of an engine and a motor, to the transmission as determined by a powertrain controller.

In a modular hybrid transmission vehicle, that emphasizes both fuel economy and driveability, the control systems operate the engine, the motor, and clutches including the torque converter bypass clutch so that the driver feels that the vehicle operates smoothly and effectively in response to drive demands and to reduce noise, vibration and harshness (NVH) often attendant to mechanically connected driveline parts.

In one embodiment of the present invention, the transmission output may be coupled to a rear driveline including a geared differential. Such systems may require greater torque handling capacity than previously known front wheel drive hybrid vehicles. The powertrain controller includes computer-based processing of data, analyzing of sensed signals, and providing actuator signals. When fuel economy is emphasized by the powertrain controller, the torque converter is locked under most conditions, but unlocks to a controlled slip mode upon demand, and is controlled in accordance with a control algorithm to dampen driveline torque disturbances during engine starting while improving energy efficiency.

BRIEF DESCRIPTION OF THE DRAWINGS

The present invention may be more clearly understood by reference to the following detailed description of a preferred embodiment, when read in conjunction with the accompanying drawing figures, in which like reference characters refer to like parts throughout the views, and in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
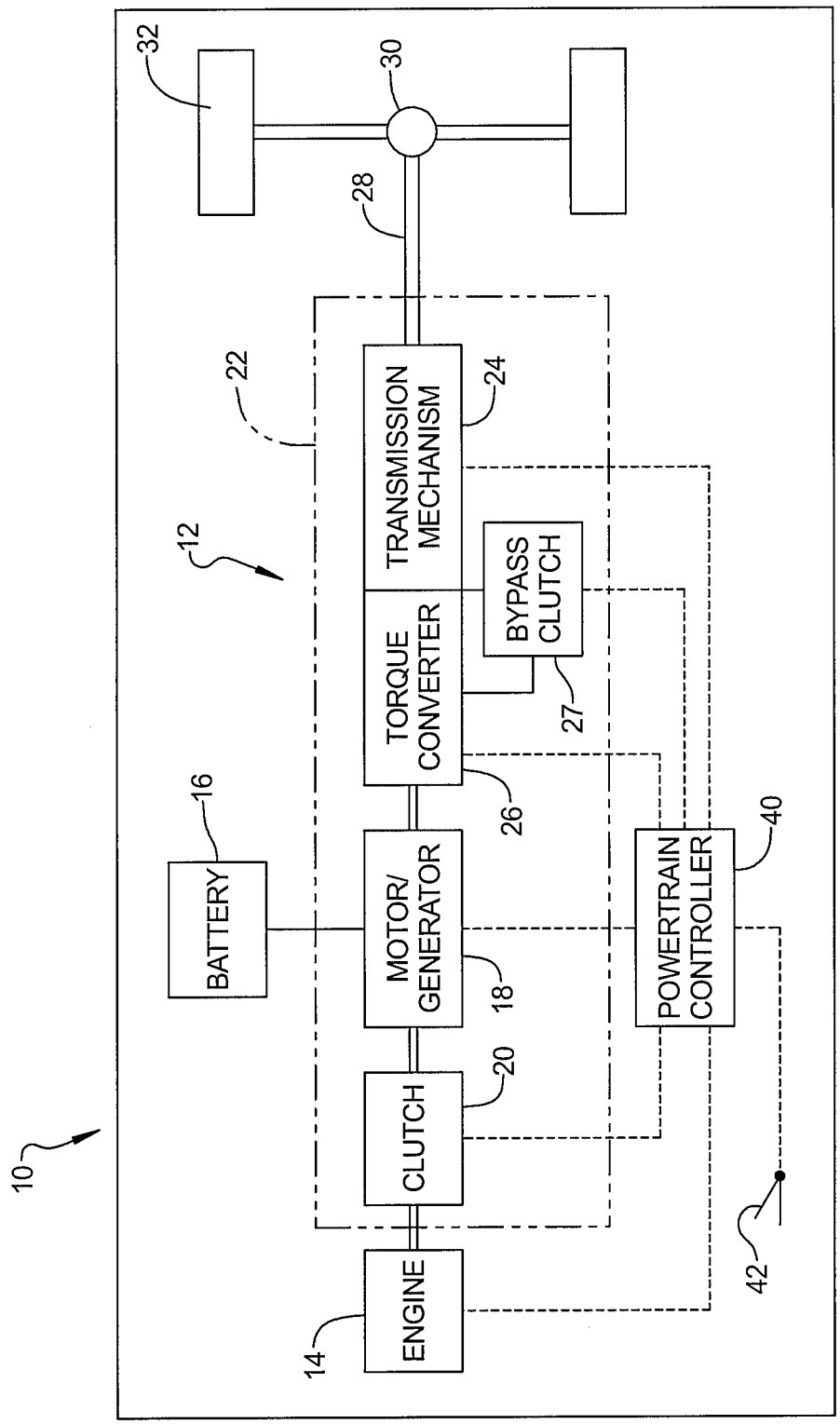
FIG. 1 is a diagrammatic view of a hybrid vehicle driveline with a modular hybrid transmission incorporating a control system operation according to the present invention.

Referring first to FIG. 1, a vehicle 10 is shown comprising a hybrid driveline 12 with a first power source in the form of internal combustion engine 14 and a second power source in the form of a battery 16 that powers a traction motor 18. One or more of the power sources may be coupled together and disengaged from each other in the driveline by means of a disconnect clutch 20. The disconnect clutch 20 may also be used to rotate the input shaft of the motor 18 by the clutch 20 so that operation of the engine 14 serves to charge the battery 16 as the motor 18 acts as a generator.

In the present embodiment, the disconnect clutch 20 disconnects the motor 18 and the engine 14 in the electrical drive mode whereby only the motor 18 is available to power the driveline. In the hybrid drive mode, the disconnect clutch 20 couples the engine 14 with the motor 18 when a rolling engine start command is generated from the powertrain controller 40. The powertrain controller 40 generates a response when the need for more drive demand or the system demand is sensed. For example, a driver's manipulation of the actuator 42, or the sensing of system demand, such as insufficient motor support for a demand due to the status of the battery 16 (that may include battery state of charge or SOC), may generate such a response.

The engine 14 and the motor 18 have an output coupled to a transmission mechanism 24 through the torque converter 26. In the preferred embodiment, a modular hybrid transmission (MHT) 22 includes mechanical and hydraulic controls for a system of multiple, stepped ratio gears arranged for multiple forward speeds, reverse speed and a neutral position. In addition, MHT 22 includes a torque converter 26. The torque converter 26 includes an impeller, and a turbine that rotates in response to fluid flow from the impeller to the turbine. A bypass clutch 27 provides a frictional coupling between the impeller and turbine of torque converter 26 and is controlled by the powertrain controller 40.

The bypass clutch 27 manages fluid pressure between the impeller and turbine of the torque converter to provide three modes of bypass clutch operation, and torque multiplication may occur depending on the amount of slip between the impeller and turbine sides. In open mode, a maximum amount of fluid is carried by the torque converter housing, separating the impeller from the turbine. In a locked mode, the minimum fluid pressure is carried in the torque converter so the pressure does not separate the impeller from the turbine and they become frictionally or mechanically locked together to eliminate slip and associated losses to improve energy efficiency. In a slip mode, a target amount of slip may be employed between the impeller and the turbine, whereby the fluid may provide the target torque ratio for the torque multiplication, in addition to NVH damping, but fuel economy is reduced due to the heat generated as a result of a slipping.

At the rear portion of the driveline, a drive shaft output 28 is linked to a differential 30 in the well-known manner of engine powered production vehicle systems, and in turn drives both of the rear wheels 32.

In accordance with a control system of one embodiment of the present invention, a powertrain controller 40 can include a distributed or consolidated set of operating systems including an engine control module (ECM), a transmission control module (TCM) and a vehicle systems controller (VSC), for example. In the representative embodiment illustrated, an input demand actuator 42, such as an accelerator pedal, is linked either electronically, mechanically or by other systems to the powertrain controller 40. In particular, the actuator 42 permits the driver to control powertrain power to the vehicle and governs performance of the vehicle. The present invention improves driveability, the driveline's ability to react with reduced noise, vibration or harshness (NVH) that may be perceived by the driver and affect the driver's sense of complete and accurate control of the numerous operations being conducted throughout the drivetrain 12 including a modular hybrid transmission with control methods of the present invention.

In a typical electrical drive mode at a higher selected stepped ratio transmission gear number (or lower gear ratio), a torque converter bypass clutch 27 is normally fully locked to improve the fuel economy. As a result, driveline torque disturbances resulting in noise, vibration and harshness may be felt as the engine 14 starts in a rolling start as the powertrain controller 40 reacts to the drive demand or the system demand and commands the power transition from the motor 18 only to the engine 14 or a combination of both the motor 18 and the engine 14. According to various embodiments of the present invention, the bypass clutch 27 is controlled to set torque converter 26 in a controlled slip mode around a target slip during the rolling engine start event. This target slip will generate a speed differential between the impeller and turbine to provide a corresponding target converter torque ratio for the torque multiplication to adjust delivered torque towards a desired torque resulting from the torque demanded at the transmission output shaft, and compensating for the loss of the electrical motor torque due to the amount of torque used to assist in the quick rolling engine start (58, FIG. 2). While in the controlled slip mode, the torque converter 26 provides damping of torque disturbances to reduce or eliminate any noise, vibration and harshness from engine start and power transition. In addition, controlled slip operation improves energy (battery and fuel) efficiency relative to completely disengaging the bypass clutch 27.

Due to the nature of the two power sources of a conventional combustion engine 16, and battery 18 powering electrical motor 20, in the vehicle 10, the driveability is a concern associated with the transition from one power source to the other power source. In a typical electrical drive mode, the vehicle is moving with a certain torque demand only supplied by the electrical motor 20 powered by the battery 18 with the torque converter 26 in locked mode to improve the fuel economy. When there is a need for engine power, the engine 14 has to quickly start and become a power source. During this rolling engine start event, the driveline 12 has to maintain substantially the same wheel torque while in the meantime robustly and quickly starting the engine 14, and seamlessly completing the power transition through the driveline from one to the other, or combining both, power sources. In order to improve the driveability, the improvement is to control the torque converter 26's slip speed and associated target torque ratio by operation of the bypass clutch 27 in the slip mode such that the torque converter 26 of the MHT 22 is used to maintain the wheel torque (and associated turbine torque) substantially constant while damping the noise, vibration and harshness during the power transition.

In contrast to various prior art control strategies that start the engine with the bypass clutch locked, or fully disengaged, when transitioning from electric mode to hybrid mode, embodiments of the present invention provide a controlled slip mode to reduce driveline torque disturbances while improving efficiency. Torque converter 26 is controlled by controlling the bypass clutch 27 in slip mode, with the target torque ratio calculated as discussed below. The converter torque ratio is controlled by controlling bypass clutch apply pressure to adjust the delivered torque towards the desired torque, which may be based on the driver demand as indicated by the accelerator pedal, or in response to a system demand, such as when the motor cannot produce enough power due to the status of the battery. Controlling or managing the target torque ratio of the torque converter 26 compensates for the loss of the electrical motor torque due to the motor assisting in the quick rolling engine start event. While in the slip mode, the torque converter 26 damps the noise, vibration and harshness from engine start and power transition.

Figure 2:
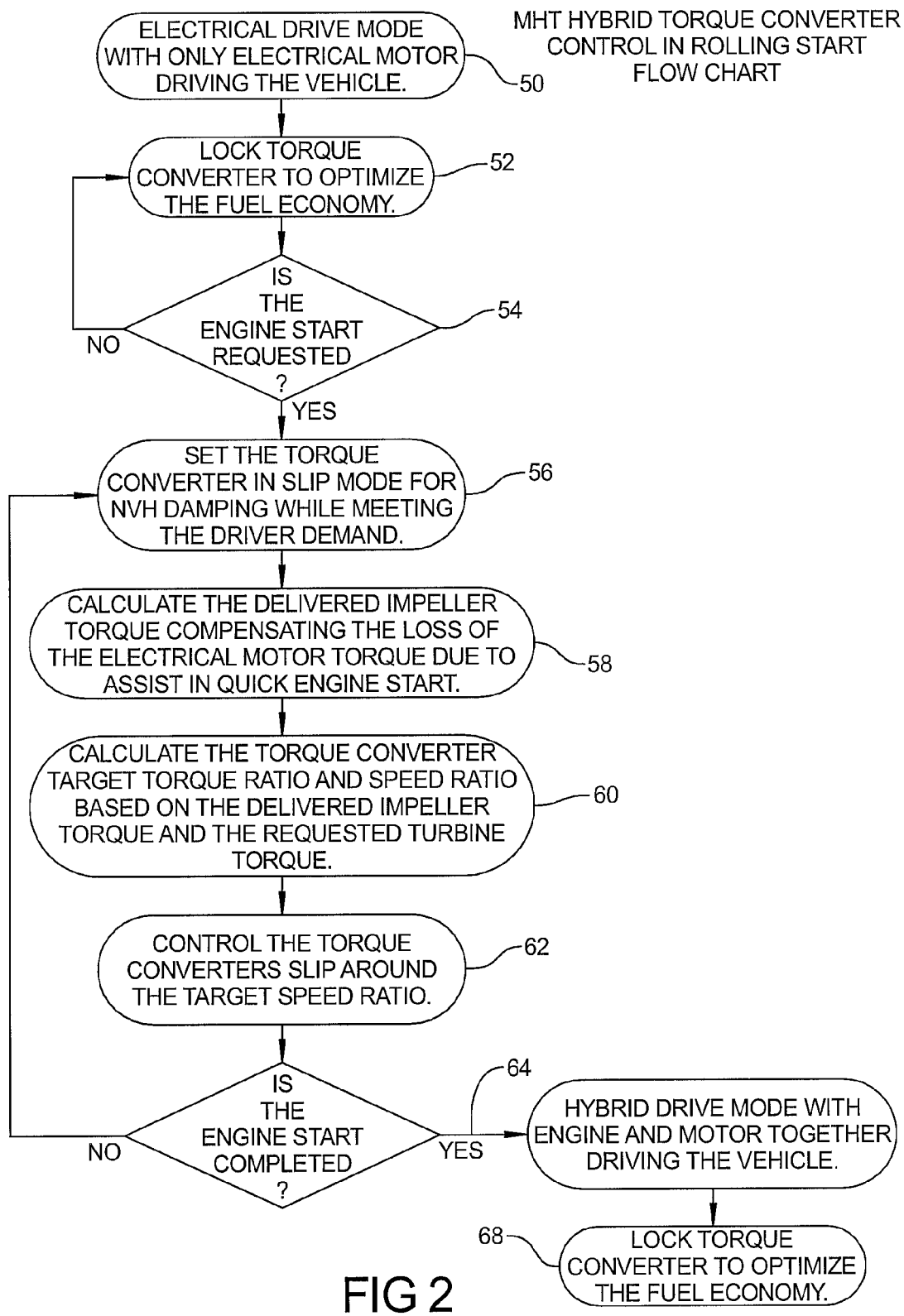
FIG. 2 is a flow chart of the control algorithm operating a driveline control according to a preferred embodiment of the present invention.

The process of control according to a representative embodiment is more clearly illustrated in FIG. 2. The terminologies and equations to calculate a hybrid desired torque ratio and associated slip speed for a representative operating scenario are described below. For example, when the actuator 42 is depressed by a driver as more vehicle torque is demanded (see step 54), from electrical drive mode steady state shown at 50 with the locked torque converter at 52, the powertrain controller 40 analyzes the drive demand and may request an engine rolling start as represented at 54. Then the powertrain controller calculates the requested turbine torque in response to the drive demand, adjusting for the transmission inefficiency losses, as indicated in the following equation:

$$\text{Tq\_TurbineRequested} = \frac{(\text{Tq\_TransOutDemand} + \text{Tq\_TransOutLoss})}{\text{GearRatio}(\text{Gear}) - \text{TransLossRatio}} \quad 1)$$

The torque converter is then operated in slip mode as shown at 56 to maintain a substantially constant turbine torque by controlling apply pressure of the bypass clutch to control the slip, speed ratio, and torque ratio of the torque converter as illustrated in the following equations. By hydraulic design, the torque converter torque ratio is associated with the speed ratio and the speed ratio or slip speed is controlled by modulation of the bypass clutch apply pressure. Therefore, by controlling the torque converter target slip, the torque converter torque ratio can be adjusted to maintain a substantially constant turbine torque while using the motor torque to assist with starting the engine.

[1] In one embodiment, a target slip speed, speed ratio, and torque ratio are determined according to the following equations:

$$\text{Converter\_TargetSlip} = \text{Spd\_Impeller} - \text{Spd\_turbine} \quad 2)$$

$$\text{Converter\_TargetSpdRatio} =$$

$$\frac{\text{Spd\_Turbine}}{\text{Spd\_Impeller}} = \frac{\text{Spd\_Impeller} - \text{Converter\_TargetSlip}}{\text{Spd\_Impeller}}$$

$$\text{Converter\_TargetTqRatio} =$$

$$f\ \text{TransConverterRatio}\ (\text{Converter\_TargetSpdRatio}),$$

The desired impeller torque is directly related to the requested turbine torque and the torque converter torque ratio, in addition to transmission pumping inefficiency losses, as illustrated by the following equation:

$$\text{Tq\_Impeller Desired} = \text{Tq\_TurbineRequested} \div \text{Converter\_Target}T q\text{Ratio} + \text{Tq\_TransPumpLoss} \quad 3)$$

As one of ordinary skill in the art will recognize, during the rolling engine start, the delivered impeller torque is the delivered motor torque, which is offset by the amount of torque used to assist in the engine start, as illustrated by the following equation:

$$\text{Tq\_ImpellerDelivered} = \text{Tq\_MotorDelivered} - \text{Tq\_EngineStart\_Assist} \quad 4)$$

After the completion of the rolling engine start, the delivered impeller torque is the sum of the delivered engine torque and the delivered motor torque, as illustrated by the following equation:

$$\text{Tq\_ImpellerDelivered} = \text{Tq\_EngineDelivered} + \text{Tq\_MotorDelivered} \quad 5)$$

Through controlling the bypass clutch and slip speed to make the torque converter generate the target torque ratio, the delivered impeller torque should generate the desired turbine torque based on the torque ratio of the converter before, during, and after the rolling engine start as illustrated by the following equations:

$$\text{Tq\_ImpellerDelivered} = \text{Tq\_Impeller Desired; therefore}$$

$$\text{Converter\_Target}T q\text{Ratio} = \text{Tq\_TurbineRequested} \div (\text{Tq\_ImpellerDelivered} - \text{Tq\_TransPumpLoss}) \quad 6)$$

When the engine start is completed, the disconnect clutch 20 may be fully engaged or locked to frictionally or mechanically link the engine 14 with the motor 18, the vehicle will drive in the hybrid drive mode combining engine and motor torque.

As such, various embodiments of the present invention control the bypass clutch 27 to operate the torque converter 26 in a controlled slip mode (56). Appropriate control of the bypass clutch to control slip to a target slip (target slip ratio) regulates the associated converter torque ratio which can be used to adjust the delivered torque towards the desired torque at the impeller and turbine. At the same time, the slipping torque converter 26 is a very good damping device to reduce the vibration and harshness from engine start and power transition. After the rolling engine start, the power source may change to the engine 14 as needed, or the combination of both the engine and the electrical motor. In order to improve the fuel economy, the controller will lock the torque converter (68 FIG. 2) once the demand has been met, as further economy may be realized by adjusting the engine torque and the motor torque contribution to the total powertrain torque.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a hybrid vehicle having a traction motor and a disconnect clutch disposed between an engine and a transmission having a torque converter including an impeller and a turbine, comprising:
    controlling slip speed between the impeller and the turbine to maintain turbine torque substantially constant during starting of the engine by the disconnect clutch coupling the motor to the engine.

2. The method of claim 1 wherein the torque converter includes a bypass clutch and wherein controlling comprises controlling apply pressure of the bypass clutch to control the slip speed.

3. The method of claim 2 wherein controlling slip speed comprises controlling slip speed to provide a desired converter torque ratio.

4. The method of claim 1 wherein the hybrid vehicle includes a disconnect clutch between the engine and the traction motor, the method further comprising:
    engaging the disconnect clutch to start the engine using the traction motor; and
    increasing the slip speed to compensate for motor torque used to start the engine.

5. The method of claim 4 wherein increasing the slip speed comprises decreasing apply pressure of the bypass clutch.

6. The method of claim 1 wherein controlling the slip speed comprises controlling turbine torque in response to a torque demand at a transmission output and adjusting for transmission losses.

7. The method of claim 1 wherein controlling the slip speed comprises maintaining a non-zero slip speed.

8. The method of claim 1 wherein controlling the slip speed comprises controlling the slip speed to a target slip speed based on a desired converter torque ratio.

9. The method of claim 1 wherein controlling the slip speed comprises controlling the slip speed to provide a torque converter torque ratio that offsets loss of traction motor torque provided to the impeller due to assisting the engine start.

10. The method of claim 1 wherein controlling the slip speed comprises controlling the slip speed to provide an associated converter torque ratio such that impeller torque delivered by the traction motor before the engine starting is substantially equal to a sum of engine torque and traction motor torque delivered to the impeller after completion of the engine starting.

11. The method of claim 1 further comprising engaging the bypass clutch to reduce the slip speed to zero after completion of the engine starting.

12. The method of claim 1 wherein controlling the slip speed comprises:
    controlling the slip speed based on a desired converter torque ratio determined based on a desired driver demand, current transmission gear ratio, transmission losses, and motor torque provided to start the engine.

13. A hybrid electric vehicle, comprising:
    an engine;
    an automatic transmission having a torque converter with an impeller, a turbine, and a bypass clutch;
    a traction motor coupled to the impeller and selectively coupled to the engine by a disconnect clutch;
    a controller configured to control the bypass clutch to vary a speed difference between the impeller and the turbine to maintain turbine torque substantially constant while starting the engine using traction motor torque engaging with the engine through the disconnect clutch.

14. The vehicle of claim 13 wherein the controller is configured to control the bypass clutch to provide a desired converter torque ratio based on the speed difference, the desired converter torque ratio being based on a driver demanded torque, current transmission gear ratio, transmission losses, and traction motor torque used to start the engine.

15. The vehicle of claim 13 wherein the controller is configured to modulate apply pressure of the bypass clutch to control the speed difference between the impeller and the turbine.

16. The vehicle of claim 13 wherein the controller is configured to lock the bypass clutch to reduce the speed difference to zero after starting the engine.

17. The vehicle of claim 13 wherein the controller is configured to increase the speed difference while starting the engine by reducing the apply pressure of the bypass clutch.

18. A method for controlling a hybrid vehicle having an engine selectively coupled by a disconnect clutch to a traction motor coupled to an automatic transmission having a torque converter with an impeller, a turbine, and a torque converter clutch, comprising:
    operating the vehicle to provide a driver demanded torque in an electric drive mode using only the traction motor with the disconnect clutch disengaged and the torque converter clutch locked with zero slip speed between the impeller and the turbine;
    engaging the disconnect clutch to start the engine using traction motor torque;
    controlling torque converter clutch apply pressure to control the slip speed and provide an associated converter torque ratio that maintains a substantially constant turbine torque to compensate for the traction motor torque used while starting the engine;
    controlling torque converter clutch apply pressure to control the slip speed and provide the associated converter torque ratio based on a combined engine torque and traction motor torque to provide the driver demanded torque after starting the engine; and
    controlling torque converter clutch apply pressure to lock the torque converter clutch and reduce the slip speed to zero after starting the engine.

19. The method of claim 18 wherein the slip speed is controlled based on the driver demanded torque, a current transmission gear ratio, transmission losses, and traction motor torque used to start the engine.

20. The method of claim 18 wherein the engine is started in response to the driver demanded torque exceeding available traction motor torque.

* * * * *